UNITED STATES PATENT OFFICE.

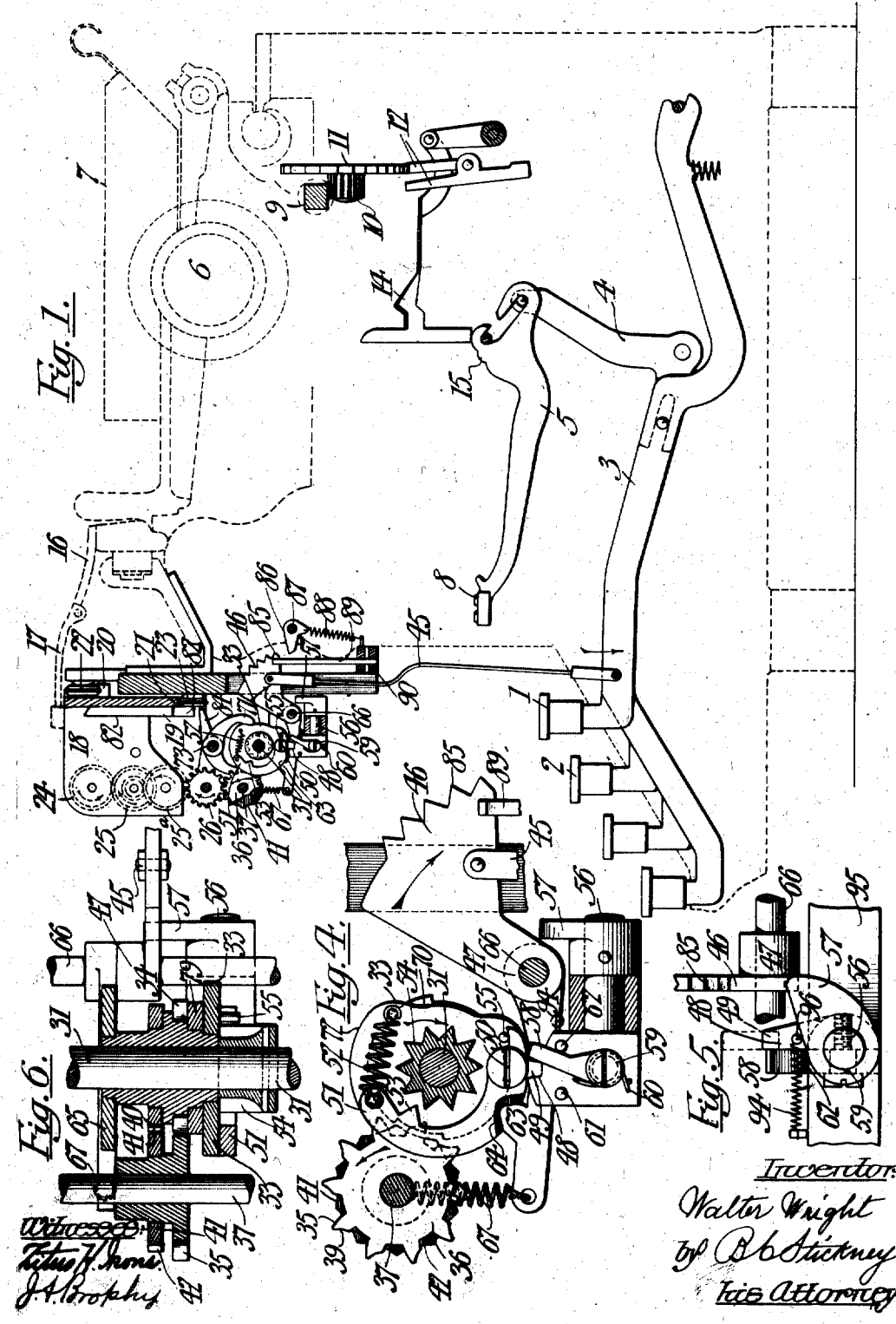

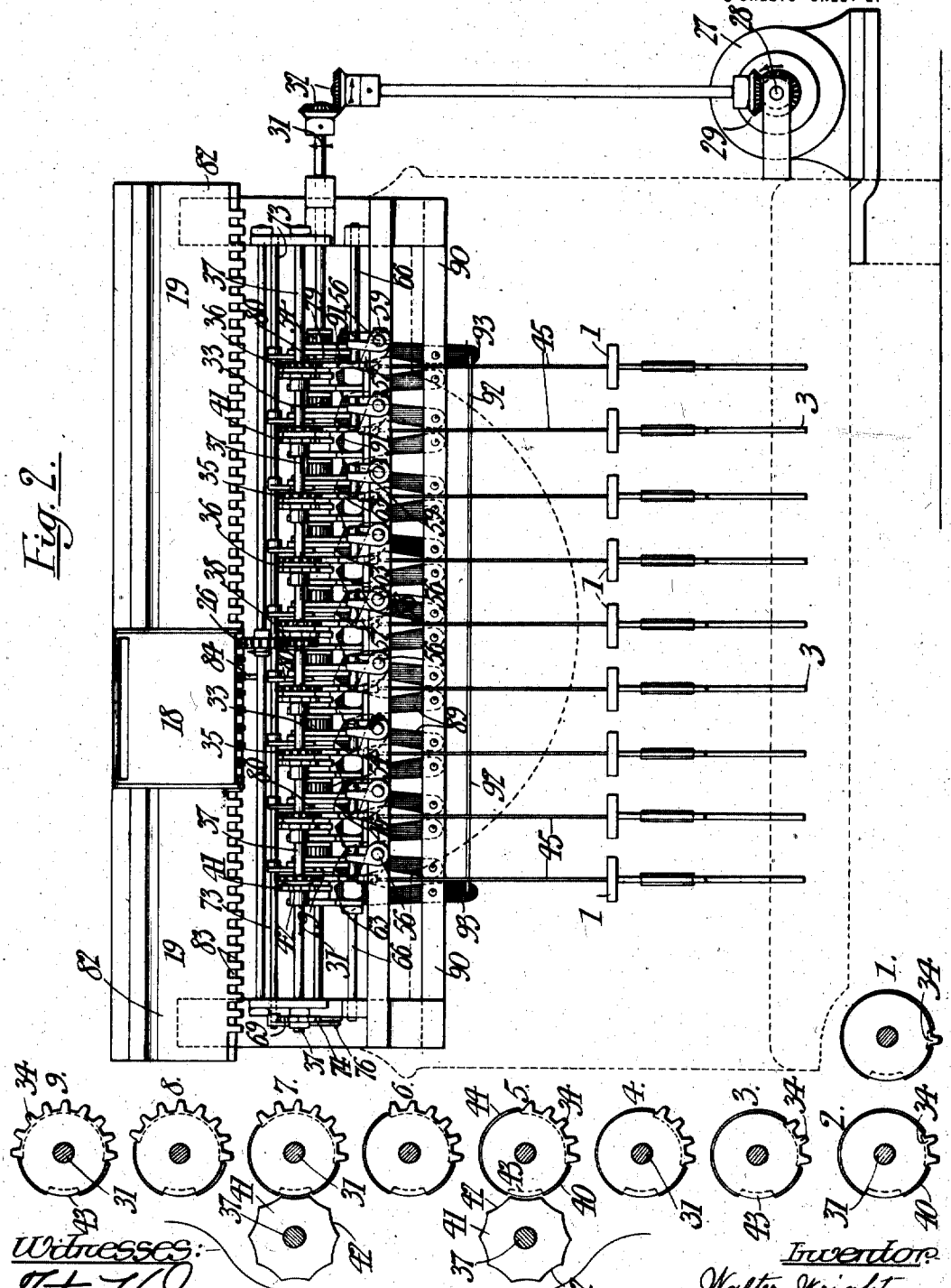

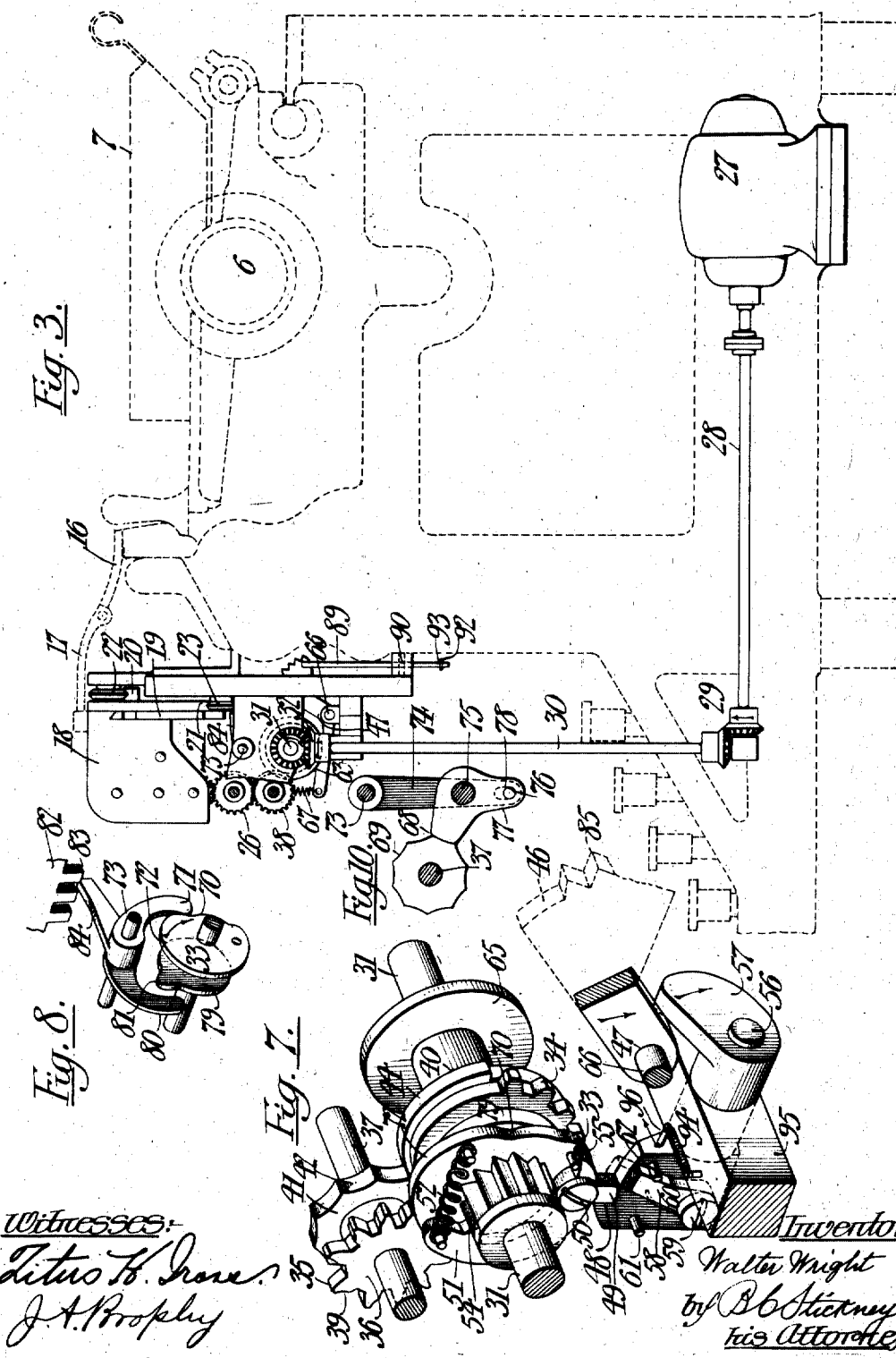

WALTER WRIGHT, OF NEW YORK, N. Y., ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,281,889.      Specification of Letters Patent.      Patented Oct. 15, 1918.

Application filed November 22, 1912. Serial No. 732,861.

*To all whom it may concern:*

Be it known that I, WALTER WRIGHT, a citizen of the United States, residing in New York city, in the county of New York and State of New York, have invented certain new and useful Improvements in Combined Type-Writing and Computing Machines, of which the following is a specification.

My invention relates to combined typewriting and computing machines of the type in which a master wheel is caused to engage *seriatim* a gang of computing wheels and turn said computing wheels to an extent determined in each case by the numeral key operated.

In the present invention, power means are provided for so turning said master wheel, and the extent of said turning may be controlled by escapements, there being a separate escapement for each numeral key.

A gang of computing wheels may be included in a totalizer which travels step-by-step with the typewriter carriage, so as to carry the computing wheels therein past the master wheel whose plane of rotation may be fixed. Said master wheel may be normally locked, and at the operation of any numeral key an escapement may connect the shaft of said master wheel to a power-driven shaft by means of intermediate gearing in such a way as to first release said master wheel shaft, then positively turn it, and then positively lock it.

The master wheel shaft may be normally locked by means of a universal lock, which by the operation of said intermediate gearing is thrown to ineffective position, while at the same time a lock under the control of the gearing for the numeral key, then being operated may become effective and hold said master wheel shaft locked. This lock is preferably in the form of a Geneva lock, and it may hold said master wheel shaft locked until the gear teeth, forming part of said Geneva combination, positively turn said master wheel shaft. As this turning is completed, a second Geneva lock may be thrown in by said gearing to positively arrest the master wheel shaft and hold it locked until the universal lock is again made effective.

When the universal lock becomes effective, the Geneva lock whose operation has just been described, becomes ineffective, thus leaving the master wheel shaft free to be turned by the operation of any other numeral key.

The escapement devices of which said Geneva lock and gearing forms a part, may be in the form of one-revolution clutches within which a power-driven shaft normally turns idly. With every depression of a numeral key, its clutch is permitted to seize said power-driven shaft and rotate the master wheel and operate the locks, as above described. Each clutch may be normally held against accidental displacement by a spring detent catching in a notch in the clutch.

The one-revolution clutch may comprise an arm, which normally holds said clutch against turning by abutting against a solid dog. On the depression of a numeral key, said solid dog may be rocked laterally clear of said stop, so as to permit the clutch to make a revolution. If the numeral key is immediately released, said solid dog may return quickly enough to arrest the clutch at the end of one revolution. If, however, the numeral key is not arrested sufficiently soon, a pivoted dog on said solid dog may be arranged to arrest said clutch by means of said stop on the clutch.

Said pivoted dog is normally swung by a spring out of the way of the stop on the clutch so as not to interfere with the lateral swinging of the solid dog. When however, said pivoted dog intercepts said stop to arrest said clutch, the stop swings the dog into position alongside of the solid dog, so that the clutch is arrested in the same position whether it is the solid dog or the pivoted dog which does the arresting. After the pivoted dog has arrested said clutch the release of the key will rock the solid dog to hold said clutch.

The mechanism may also comprise a full-stroke mechanism for each numeral key so as to prevent any key once part way depressed, from being returned, unless it is depressed to the full extent. This full-stroke mechanism may comprise a toothed-plate which coöperates with a pivoted pawl. For accomplishing this result, the said toothed-plate may comprise an arm for operating the clutch escapement device above described. Said mechanism may also comprise a series of dogs arranged to prevent the depression of more than one key at a time, said dogs being adapted to be swung sidewise when the key is depressed, and the amount of said swinging being limited to the thickness of one of said toothed plates. Since the space over which said dogs can swing is no greater than the thickness of one of said toothed plates, the depression of one of said plates will close the space between the dogs and so render impossible the depression of any other.

The mechanism may also comprise means for preventing the transverse feed of the totalizer, while any computing wheel is being turned. The mechanism for this purpose may comprise a rack fast on the totalizer carriage, into which rack a tooth is swung by the rotating clutch which is driving the master wheel. Said tooth may be positively held in engagement with said rack during practically the entire revolution of said clutch, and then be positively moved out therefrom by means of said clutch.

By the above means, I have provided a combined typewriting and computing mechanism in which the load on the numeral keys consists practically exclusively of the operation of the fixed and pivoted dogs, above described; while the power drive turns the master wheels, the computing wheels and all the locks, including the lock for preventing transverse feeding of the totalizer relative to the master wheel.

Other features and advantages will hereinafter appear.

In the accompanying drawings,

Figure 1 is a sectional side view of a combined typewriting and computing machine, showing my invention as applied thereto, certain parts being omitted for the sake of clearness.

Fig. 2 is a front view of the same.

Fig. 3 is a side view of the same, showing particularly the power drive.

Fig. 4 is a side view of part of the connections between one numeral key and the master wheel shaft.

Fig. 5 is a rear view of the escapement for the clutch.

Fig. 6 is a section through the clutch, showing some adjacent parts.

Fig. 7 is a perspective view of the parts seen in the last three figures.

Fig. 8 is a detail perspective of the lock for the totalizer carriage.

Fig. 9 is a diagrammatic series of side views of the gears by which the different clutches drive the master wheel to different extents, certain of said gears being shown in relation to their Geneva locks.

Fig. 10 is a detail of the universal lock.

Numeral keys 1 and alphabet keys 2 of the typewriter depress key levers 3, causing bell cranks 4 to swing type bars 5 rearwardly and upwardly against the platen 6 mounted in a traveling carriage 7, so that the type 8 on said type bars 5 print against said platen. Said carriage is drawn in letter-feeding direction by means of a spring barrel, not shown, and is controlled in said letter-feeding by means of a rack 9 in which works a pinion 10 connected to an escapement wheel on which escapement wheel dogs 12 and 13 are caused to operate to feed said carriage by means of a universal bar 14 operated from heels 15 on the type bars, said heels striking said bar as the types approach the platen.

As said carriage 7 moves forward in letter-feeding direction, a bracket 16 thereon, by means of a pivoted arm 17, causes a totalizer 18 on a totalizer carriage 19 to be carried along therewith. Said carriage comprises tracks 20 and 21 which engage rolls 22 and 23, so that it will slide along easily. Said totalizer comprises dial wheels 24 and computing wheels 25 which, in a manner hereinafter to be described, are caused to be turned by the master wheel 26 from the electric motor 27. Said electric motor may be continuously running, and includes a shaft 28 which, by means of bevel gears 29 and a vertical shaft 30, turns the power-driven shaft 31 of the computing mechanism by means of bevel gears 32. Loosely mounted on the drive shaft 31 are a series of clutch members 33, one for each numeral key, which are arranged to seize said drive shaft 31, so as to turn therewith, and through connections presently to be described, turn the master wheel 26. These clutch members 33 form parts of integral locking and driving units.

For so turning said master wheel, each locking and driving unit comprises a mutilated gear 34, which when turned, strikes teeth 35 of a gear wheel 36 fast on the counter shaft 37. Said counter shaft 37 also carries fast thereon a gear wheel 38 meshing with a gear fast on the master wheel 26, so that every time the counter shaft 37 is turned, the master wheel 26 will be turned to a corresponding extent. The computing wheels 25 are turned by the master wheel 26 by intermediate gears 25ᵃ of which there is one for each computing wheel. The teeth 35, as will be seen best in Fig. 7, are cut away on the faces 39, which do not bear on any other gear, so that when the mutilated gear 34 strikes them there can be no possible interference with the ineffective faces of said teeth 35.

The counter shaft 37, previously to being turned by the mutilated gear 34, is temporarily held positively locked by means of a Geneva lock 40 forming part of the locking and driving unit. Said Geneva lock 40 when turned with said mutilated gear, comes in front of one face of a ten-faced wheel 41, whose faces 42 are concaved so as to fit closely the Geneva lock 40 of the mutilated gear 34.

The relation between the mutilated gear 34 and the ten-faced wheel 41 is best shown, when idle, in Fig. 9 at wheel number 5 therein. Herein it will be seen that when idle, a cut-away portion 43, on the Geneva lock 40 stands opposite the ten-faced wheel so that said ten-faced wheel may freely turn. As has been said, with the turning of the mutilated gear 34 the raised portion of said Geneva lock 40 comes in front of and positively locks said ten-faced wheel against turning. Later a part of the Geneva lock 40 which is cut away comes in front of the ten-faced wheel 41 so as to permit the ten-faced wheel to turn when the mutilated gear 34 is turning the counter shaft 37, said ten-faced wheel being fast on said shaft 37.

The counter shaft 37 is positively arrested after it has been turned to the correct extent by means of a second Geneva lock 44, fast on the Geneva lock 40, which comes in front of said ten-faced wheel 41 so as to lock it, thus positively preventing any overthrow of the counter shaft by means of the mutilated gear 34.

The clutch members 33, as has been stated, turn freely on the drive shaft 31. With every depression of a numeral key, one of said clutch members 33 is locked to the power-driven shaft 31 to be turned therewith for one revolution. For thus locking it, a link 45 pivoted on its numeral key extends upwardly to where it is pivoted on a segment 46, said segment being pivoted at 47 and operating an escapement for locking the clutch member to the drive shaft.

Said escapement comprises a solid dog 48, which normally lies in the path of a stop 49 pivoted at 50 on the clutch member 33. Said stop 49 forms one end of a bell crank 51, which is drawn by means of a spring 52 so as to tend to cause a tooth 53 thereon to lock with one of the teeth 54 fast on the drive shaft 31. Said tooth, however, is normally held out of the path of teeth 54, because the friction which exists between the drive shaft 31 and the clutch member 33, causes the stop 49 to bear against the fixed dog 48, and so hold the bell crank 51 outwardly. This outward throw is limited by means of a pin 55 set in the clutch member 33.

When the numeral key is depressed the solid dog 48 is swung to ineffective position. It swings thus with the stub shaft 56 to which it is fast by means of a rock arm 57 fast on said stub shaft 56 and underlying an arm of the segment 46. Thus when the segment 46 is swung down by the depression of the numeral key, the solid dog will be swung to the left, as viewed in Fig. 2, and thus permit the spring 52 to draw on the tooth 53 so that it will mesh with the teeth 54 and thereby the clutch member 33 will revolve with the drive shaft 31.

If the numeral key is released rapidly enough, the solid dog will swing back into position and arrest the clutch member 33 by intercepting the stop 49, which not only will arrest said clutch member, but will release it from the drive shaft 31 by swinging the tooth 53 clear of the teeth 54. If, however, the numeral key is held depressed, the stop 49 is arrested by a pivoted dog 58 pivoted on the solid dog at 59 which pivoted dog is normally swung rearwardly by means of a spring 60 around said pivot out of the path of the stop 49, so that when said solid dog is rocked, the pivoted dog 58 will rock clear of the stop 49. If said pivoted dog 58 intercepts the stop 49, the dog will be swung forward till it strikes a pin 61, forming a solid abutment on the solid dog, when it arrests the stop. When the numeral key is then released, the dogs 48 and 58 will then have their faces in the same plane so that they can slide past stop 49 smoothly, till said fixed dog 48 alone holds the stop 49. The spring 60 will then swing the pivoted dog 58 forward till it strikes a pin 62 against which it normally rests.

Any rebound of the clutch member 33 is prevented by means of a spring detent 63, which is normally drawn so as to enter a depression 64 in a plate 65 fast to the clutch member 33, which detent is pivoted on the shaft 66 to which the segments 46 are pivoted and is drawn upward by means of a spring 67 at the outer end thereof.

The master wheel is normally held locked against accidental rotation by means of a universal lock 68, which bears against a ten-faced wheel 69, formed like the ten-faced wheels 41. Thus the universal lock holds the master wheel locked when all the Geneva locks 40 are in their ineffective positions.

Said universal lock is moved to ineffective position with the initial part of the turning of any clutch member 33. For this purpose, each clutch member 33 is formed with its outer surface as a cam. Said cam, as seen in Figs. 4, 7 and 8, comprises a cut-away portion 70, in which a cam finger 71 normally rests idly. When the clutch member 33 begins to turn, it brings a raised portion 72 under said finger 71 so as to swing the shaft 73 to which said finger 71 is fast, and by means of a rock arm 74 fast on said shaft 73, the locking member 68 is swung to ineffective position around its pivot 75. The connections between said rock arm 74 and the lock 68 include a pin 76 fast on an extension 77 of said lock, and a slot 78 in said rock arm in which said pin works. As the clutch member 33 continues to turn, the raised cam surface 72 thereon continues to hold the universal lock in ineffective position. When, however, the clutch member 33 has nearly completed one revolution, a second cam 79 formed as part of said locking and driving unit strikes a second cam finger 80 by means of a raised portion 81 on said cam, so as to positively rotate the rock shaft 73 to which said finger 80 is fast in the opposite direction, thereby positively moving the lock 68 into the position seen in Fig. 10.

While the drive shaft is turning the computing wheels through the master wheel, the totalizer carriage is positively locked against transverse movement. In this way any possible stripping of the gears in the totalizer by failing to mesh properly with the gears of the master wheel is rendered impossible. For thus locking the totalizer carriage, a lower face 82 thereon has rack teeth 83 cut in it, which are arranged to be engaged by a rock arm 84 fast on the rock shaft 73. Said rock shaft 73, it will be remembered, is the one which operates the universal lock 68. It is accordingly seen that since said shaft always holds one of the two locks 84 and 68 effective and the other ineffective either the master wheel is held locked against turning, or else the totalizer is held locked against transverse movement.

A locking and driving unit as seen in section in Fig. 6, includes all the parts embracing the shaft 31 between the clutch member 33 and the cam 65. These parts are all fast to each other and turn as a unit on said shaft 31. Since each unit determines or indexes the amount to which the master wheel turns when its key is actuated, the units as a group form an indexing device universal to the master wheel.

The segments 46 may be utilized as part of the full-stroke mechanism, so as to prevent any numeral key from being partly depressed and then returning before completing its depression. For this purpose, the rear side 85 of said segments is cut into teeth which are each arranged to coöperate with its swinging pawl 86 pivoted at 87 and drawn by a spring 88 so as to project into the path of said teeth. Said pawl 86 is of such length that when one tooth 85 passes it, any return movement of the key will catch said tooth, but when all the teeth 85 have passed the pawl, the spring 88 swings the pawl so that the teeth 85 may strike on the opposite side of the point of said pawl, and thus push it aside idly.

Said segments 46 may likewise be utilized as means for preventing more than one key from being depressed at any one time. To accomplish this, said segments 46 lie between upstanding dogs 89 pivoted in a bar 90, there being two dogs for each segment 46, and the dogs being so formed that they have sloping faces 91 forming fairly sharp points which almost meet just below the segments 46. The throw of said dogs 89 is limited by having the two end dogs joined by a bar 92 pivoted on downwardly extending arms 93 of said end dogs. The length of the bar 92 is such that there is a little lost motion between the dogs, the total lost motion being just enough to accommodate the thickness of one of the segments 46, so that when one of said segments occupies the space between any two of said dogs, all the other dogs will have their points in contact, and therefore no other segment 46 can enter between the dogs.

Since the segments 46 are linked to the numeral keys it is consequently impossible for any numeral key to be depressed, while any other one is depressed.

The solid dog 48 is normally held in position to arrest the stop 49 by means of a spring 94 anchored in the cross-bar 95 on which said dogs are journaled and drawing on said fixed dog by means of a pin 96 fast thereon.

Variations may be resorted to within the scope of the invention, and portions of the improvements may be used without others.

Having thus described my invention, I claim.

1. In a combined typewriting and computing machine, the combination with a series of numeral keys and computing mechanism comprising computing wheels, a master wheel, and a master wheel driver, of a lock normally preventing rotation of said master wheel, a series of indexing and lock-controlling units, one for each numeral key, each comprising means to cause said lock to release said master wheel, means to impart to said master wheel, through said driver, a rotation of predetermined extent, and means to relock said master wheel after its rotation, a motor to drive said indexing and lock-controlling units, and a series of key-controlled one-revolution clutches, one for each key, by means of which each key may initiate the driving connection from the motor to its corresponding indexing and lock-controlling unit to cause it to effect its cycle of unlocking, driving, and locking operations.

2. In a combined typewriting and computing machine, the combination with a typewriter carriage, a series of numeral keys, and a carriage escapement controlled by said keys, of computing mechanism comprising computing wheels, a master wheel, and a master wheel driver, relative lateral movement between the master wheel and the computing wheels being effected by connecting parts of said computing mechanism to move with said carriage, a lock normally preventing rotation of said master wheel, a lock to prevent movement of said carriage during rotation of said master wheel, a series of indexing and lock-controlling units, one for each numeral key, each comprising means to cause said locks to lock said carriage and release said master wheel, means to impart to said master wheel, through said driver, a rotation of predetermined extent, and means to relock said master wheel and release said carriage, a motor to drive said indexing and lock-controlling units, and a series of key-controlled one-revolution clutches, one for each key, by means of which each key may initiate the driving connection from the motor to its corresponding indexing and lock-controlling unit to cause it to effect its cycle of unlocking, driving, and locking operations.

3. In a combined typewriting and computing machine, the combination with numeral keys, computing wheels and a motor for turning said wheels to an extent determined by the numeral key operated, of a constantly rotating shaft driven by said motor, a mutilated gear for each numeral key having teeth on it corresponding to the number of said key, a master wheel shaft normally locked, and means for clutching each mutilated gear by its key to the constantly rotating shaft to cause said gear to unlock said master wheel and then positively turn said master wheel, and then positively lock said master wheel after it is thus turned.

4. In a combined typewriting and computing machine, the combination with numeral keys, computing wheels and a motor for turning said wheels to an extent determined by the numeral key operated, of a constantly rotating shaft driven by said motor, a series of clutches on said shaft, each comprising a mutilated gear normally held stationary, teeth on said gear corresponding to the number of the numeral key controlling it, an escapement operated by each numeral key for causing its clutch to seize said shaft and turn said mutilated gear one revolution, a master wheel for turning said computing wheel *seriatim*, a lock normally holding said master wheel, a gear for each of said clutches to cause the mutilated gears respectively to turn said master wheel, and means operated by the clutch for unlocking said master wheel, for rotating said master wheel, and for again locking said master wheel.

5. In a combined typewriting and computing machine, the combination with numeral keys, computing wheels and a motor for turning said wheels to an extent determined by the key operated, of a constantly rotating shaft driven by said motor, a clutch for each numeral key on said constantly rotating shaft, a mutilated gear carried by each clutch corresponding to the number of the numeral key, a stop on said clutch by which it is normally held, a fixed dog for holding said clutch by said stop, a swinging dog pivoted on said fixed dog, and means for rocking each fixed dog out of the path of its stop by its numeral key, so that its clutch will seize and simultaneously bring the pivoted dog into the path of said stop so as to arrest it at the end of one rotation of said clutch.

6. In a combined typewriting and computing machine, the combination with numeral keys, computing wheels and a motor for turning said wheels to an extent determined by the numeral key operated, of a series of locking and driving units, one for each numeral key, each unit having a number of driving teeth thereon proportional to the numeral key controlling it, a constantly rotating shaft driven by said motor, and means controlled by each numeral key causing the constantly rotating shaft to drive its locking and driving unit to first lock the master wheel against rotation, then to positively rotate said master wheel, and then to lock said master wheel.

7. In a combined typewriting and computing machine, the combination with numeral keys, computing wheels and a motor for turning said wheels to an extent determined by the numeral key operated, of a series of locking and driving units, one for each numeral key, each unit having a number of driving teeth thereon proportional to the numeral key controlling it, a constantly rotating shaft driven by said motor, means controlled by each numeral key for causing the constantly rotating shaft to drive its locking and driving unit to first lock the master wheel against rotation, then to positively rotate said master wheel, and then to lock said master wheel, a lock normally holding said master wheel against rotation, a lock adapted to lock said master wheel against transverse movement relative to the computing wheels, and means for positively moving said rotation lock to ineffective position and said transverse speed lock to effective position by said locking and driving unit, and for positively reversing said operation.

8. In a combined typewriting and computing machine, the combination with numeral keys, computing wheels and a motor for turning said wheels to an extent determined by the numeral key operated, of a constantly rotating shaft driven by said motor, a series of clutches comprising mutilated gears, one for each numeral key, a series of Geneva locks, each lock associated with its clutch, a master wheel for turning said computing wheels *seriatim*, said Geneva locks being normally ineffective on said master wheel, a member on each Geneva lock for positively locking said master wheel on the initial rotation of said clutch previous to its rotation by its gear, a second lock on each clutch for locking said master wheel after it is rotated by the mutilated gear, and a detent for normally holding said clutches so that the Geneva locks thereon hold said master wheel unlocked.

9. In a combined typewriting and computing machine, the combination with computing mechanism including a series of computing wheels and a master wheel therefor, of a series of numeral keys, a series of indexing devices, one for each numeral key, to operate said master wheel to an extent dependent upon the numeral key operated, a motor to drive said indexing devices, a series of key-controlled one-revolution clutches, one for each key, for establishing driving connections from said motor to said indexing devices, a series of pivoted, key-operated controllers, one for each key, means engaged by each controller when moved by its key to trip the corresponding clutch, means engaged and operated by each controller when moved to prevent the return of its controlling key prior to the completion of its stroke, and means engaged by each controller, when moved by its key, to prevent the operation of another numeral key prior to the return of the key by which it is controlled.

10. In a combined typewriting and computing machine, the combination with numeral keys, computing wheels and a motor for turning said wheels to an extent determined by the numeral keys operated, of a master wheel for turning said computing wheels seriatim, a series of locking and driving units for turning said master wheel, there being one unit for each numeral key, means operated by each unit for locking said master wheel against rotation by the initial rotation of said unit, a lock normally holding said master wheel against rotation, a lock for holding said master wheel and computing wheels against relative transverse movement, means operated by said unit for positively unlocking said rotational lock and locking said transverse feed lock as each unit initially locks said master wheel, a gear on each unit for turning said master wheel to an extent determined by the numeral key operated, a lock on each unit for positively locking the master wheel after it is thus turned, and means on said unit for positively relocking the rotational lock of said master wheel and unlocking the transverse feed lock thereof.

11. In a combined typewriting and computing machine, the combination with numeral keys, computing wheels and a motor for turning said wheels to an extent determined by the numeral key operated, of a shaft constantly driven by said motor, a series of locking and driving units loose on said shaft, a clutch for each unit, a master wheel shaft arranged to be either locked or driven by said units, and means for causing each clutch to lock its unit to the constantly rotating shaft by its numeral key.

12. In a combined typewriting and computing machine, the combination with numeral keys, computing wheels and a motor for turning said wheels to an extent determined by the numeral key operated, of a series of clutches, one for each numeral key, a stop on each clutch, a fixed dog arranged to lie in the path of said stop so as to hold said clutch normally released, an arm for rocking each dog out of the path of said stop by the numeral key so as to cause said clutch to seize, and a pivoted dog on each fixed dog for arresting said clutch.

13. The combination with a shaft arranged to be constantly rotated, of a clutch on said shaft, and a Geneva member fast to said clutch on said shaft adapted to positively lock or positively rotate a computing wheel.

14. In a computing machine, the combination with computing mechanism comprising an actuator shaft and a driving shaft, of an indexing unit to be driven from said driving shaft, a clutch to establish a driving connection from said driving shaft to said indexing unit, an escapement to render said clutch effective when tripped and to disengage said clutch after a predetermined rotation of said indexing unit, means to hold said indexing unit in its normal position when said clutch is disengaged, means on said actuator shaft to be engaged by said indexing unit during a portion of its predetermined movement to impart a predetermined rotation to said actuator shaft, and locking means controlled by said unit to prevent rotation of said actuator shaft during rotation of said indexing unit except when effective as a driver, said locking means being ineffective when said unit is in normal position.

15. In a computing machine, the combination with a motor, and a master wheel, of normal locking means, separate initial locking means, turning means for releasing the normal locking means and making the initial locking effective, and final locking means made effective by the turning means but normally unlocked.

16. In a combined typewriting and computing machine, the combination with numeral keys, computing wheels and a motor for turning said wheels to an extent determined by the numeral key operated, of a rotating shaft driven by said motor, a mutilated gear for each numeral key having teeth on it corresponding to the number of said key, a master wheel shaft normally locked, and means for clutching each mutilated gear by its key to the rotating shaft to cause said gear to unlock said master wheel and then positively turn said master wheel, and then positively lock said master wheel after it is thus turned.

17. In a combined typewriting and computing machine, the combination with numeral keys, computing wheels and a motor for turning said wheels to an extent determined by the numeral key operated, of a rotating shaft driven by said motor, a series of clutches on said shaft, each comprising a mutilated gear normally held stationary, teeth on said gear corresponding to the number of the numeral key controlling it, an escapement operated by each numeral key for causing its clutch to seize said shaft and turn said mutilated gear one revolution, a master wheel for turning said computing wheels *seriatim*, a lock normally holding said master wheel, a gear for each of said clutches to cause the mutilated gears respectively to turn said master wheel, and means operated by the clutch for unlocking said master wheel, for rotating said master wheel, and for again locking said master wheel.

18. In a combined typewriting and computing machine, the combination with numeral keys, computing wheels and a motor for turning said wheels to an extent determined by the key operated, of a rotating shaft driven by said motor, a clutch for each numeral key on said rotating shaft, a mutilated gear carried by each clutch corresponding to the number of the numeral key, a stop on said clutch by which it is normally held, a fixed dog for holding said clutch by said stop, a swinging dog pivoted on said fixed dog, and means for rocking each fixed dog out of the path of its stop by its numeral key, so that its clutch will seize and simultaneously bring the pivoted dog into the path of said stop so as to arrest it at the end of one rotation of said clutch.

19. In a combined typewriting and computing machine, the combination with numeral keys, computing wheels and a motor for turning said wheels to an extent determined by the numeral key operated, of a series of locking and driving units, one for each numeral key, each unit having a number of driving teeth thereon proportional to the numeral key controlling it, a rotating shaft driven by said motor, and means controlled by each numeral key causing the rotating shaft to drive its locking and driving unit to first lock the master wheel against rotation, then to positively rotate said master wheel, and then to lock said master wheel.

20. In a combined typewriting and computing machine, the combination with numeral keys, computing wheels and a motor for turning said wheels to an extent determined by the numeral key operated, of a series of locking and driving units, one for each numeral key, each unit having a number of driving teeth thereon proportional to the numeral key controlling it, a rotating shaft driven by said motor, means controlled by each numeral key for causing the rotating shaft to drive its locking and driving unit to first lock the master wheel against rotation, then to positively rotate said master wheel, and then to lock said master wheel, a lock normally holding said master wheel against rotation, a lock adapted to lock said master wheel against transverse movement relative to the computing wheels, and means for positively moving said rotation lock to ineffective position and said transverse feed lock to effective position by said locking and driving unit, and for positively reversing said operation.

21. In a combined typewriting and computing machine, the combination with numeral keys, computing wheels and a motor for turning said wheels to an extent determined by the numeral key operated, of a rotating shaft driven by said motor, a series of clutches comprising mutilated gears, one for each numeral key, a series of Geneva locks, each lock associated with its clutch, a master wheel for turning said computing wheels *seriatim*, said Geneva locks being normally ineffective on said master wheel, a member on each Geneva lock for positively locking said master wheel on the initial rotation of said clutch previous to its rotation by its gear, a second lock on each clutch for locking said master wheel after it is rotated by the mutilated gear, and a detent for normally holding said clutches so that the Geneva locks thereon hold said master wheel unlocked.

22. In a combined typewriting and computing machine, the combination with numeral keys, computing wheels and a motor for turning said wheels to an extent determined by the numeral key operated, of a shaft driven by said motor, a series of locking and driving units loose on said shaft, a clutch for each unit, a master wheel shaft arranged to be either locked or driven by said units, and means for causing each clutch to lock its unit to the rotating shaft by its numeral key.

23. The combination with a shaft arranged to be rotated, of a series of cluches on said shaft, a plurality of Geneva members on said shaft adapted to positively lock or positively rotate a computing wheel, and numeral keys selectively controlling said Geneva members through said clutches.

24. In a computing machine, the combination with computing mechanism comprising an actuator shaft and a driving shaft, of an indexing unit to be driven from said driving shaft, a clutch to establish a driving connection from said driving shaft to said indexing unit, an escapement to render said clutch effective when tripped and to disengage said clutch after a predetermined rotation of said indexing unit, means engaging said indexing unit to hold it in normal position when said clutch is disengaged, a discontinuous driving connection comprising a pinion fast on said actuator shaft and a segmental gear fast on said indexing unit to impart a predetermined rotation to said actuator shaft upon each rotation of said indexing unit, and a Geneva lock comprising a part fast upon said actuator shaft and also including parts of said indexing unit, said Geneva lock being effective to prevent rotation of said actuating shaft during the whole period of rotation of said indexing unit except that portion during which it is effective as a driver, said locking means being ineffective when said unit is in normal position.

25. In a computing machine, the combination with numeral keys, of a master wheel and its shaft, Geneva locks for controlling said master wheel shaft, a power shaft for driving said master wheel shaft on which power shaft said locks are journaled, and an escapement under the control of each numeral key adapted to lock its Geneva lock to the power shaft.

26. In a computing machine, the combination with a power shaft and a master wheel shaft, of a series of wheels each comprising teeth fast on said power shaft, a series of integral units loosely mounted on said power shaft, each unit adjacent one of said toothed wheels and adapted to either drive or lock said master wheel shaft, and a member associated with each unit for clutching it to its toothed wheel, to cause a key-operated escapement to be effective thereon.

27. In a computing machine, the combination with an indexing member and a drive shaft for driving said member, of an escapement dog normally holding said indexing member released from said shaft, a key adapted to swing said dog to ineffective position, and an auxiliary dog for arresting said indexing member if the key is held depressed, said auxiliary dog being moved into its effective position by said key when said escapement dog is moved to its ineffective position.

28. In a computing machine, the combination with numeral keys and computing wheels, of a power shaft, clutches under the control of said keys for causing said wheels to be turned by said shaft, each clutch forming part of an indexing device for turning said wheels, a traveling carriage for selecting the wheel to be turned, an escapement for said carriage controlled by said keys independently of said shaft, a locking device for preventing said carriage from feeding improperly, and means whereby said shaft drives said device through said clutches to positively make it effective when a clutch is effective and positively make it ineffective when a clutch ceases to be effective.

29. In a computing machine, the combination with a power-driven shaft and an indexing device journaled on said shaft to turn therewith, of a key-controlled device for determining when it shall turn, a wheel for transmitting motion from the indexing device to other parts of the machine during a computing operation, normal locking means for said wheel, and temporary locking means for said wheel, each of said locking means including a part carried by said indexing device, whereby a rotation of said indexing device will first effect the removal of said normal lock and apply said temporary lock and subsequently remove said temporary lock and drive said wheel.

WALTER WRIGHT.

Witnesses:
 TITUS H. IRONS,
 F. E. ALEXANDER.